Fig. 2

INVENTOR
John P. Woodnutt
BY
Kenyon, Palmer & Stewart
ATTORNEY

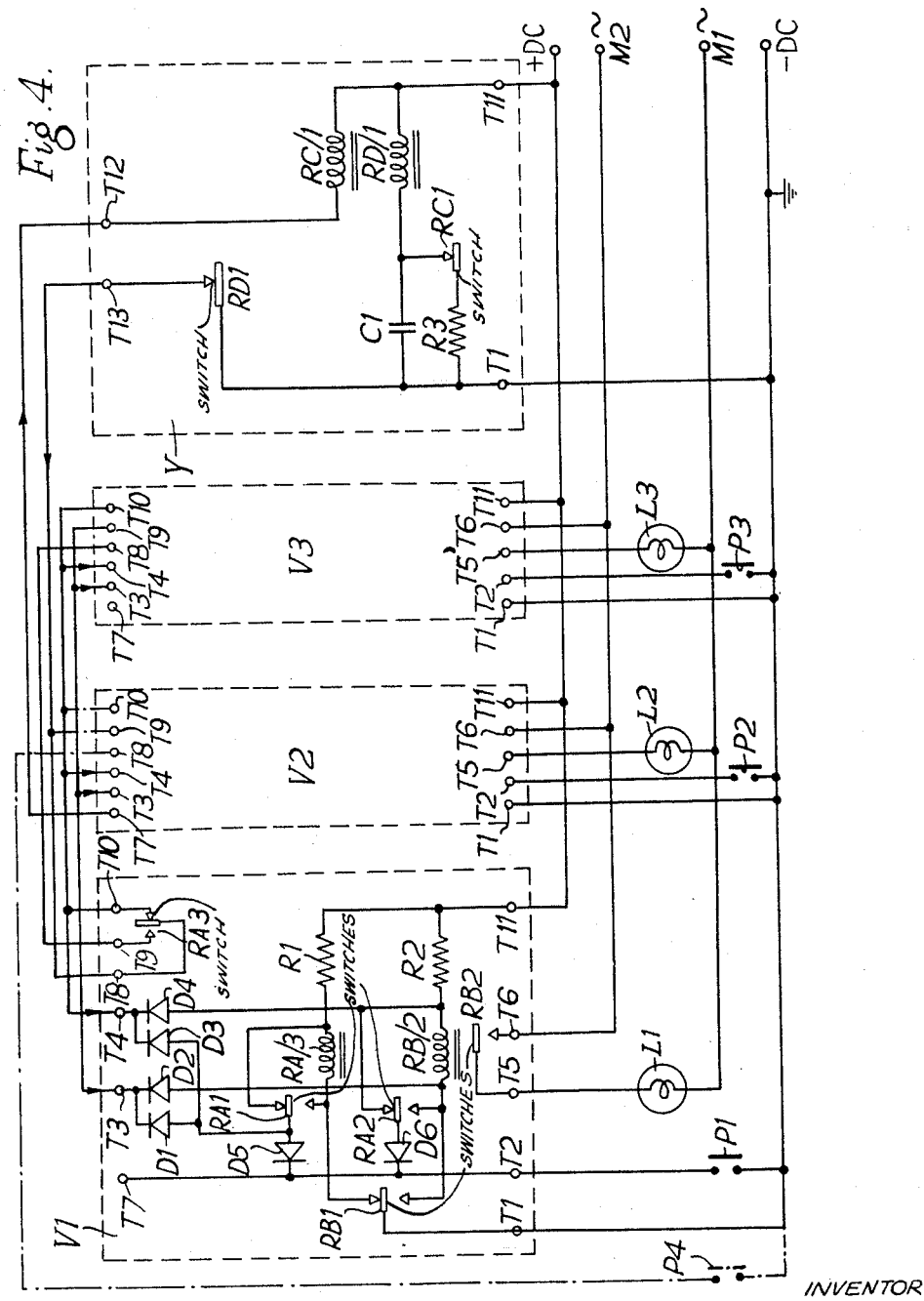

3,161,784
ELECTRIC CONTROL SYSTEMS
John Peter Woodnutt, Esher, England, assignor to Delmatic Limited, London, England, a British company
Filed July 25, 1960, Ser. No. 45,211
Claims priority, application Great Britain, July 30, 1959, 26,127/59
13 Claims. (Cl. 307—112)

The present invention relates to electric control systems for controlling the supply of electricity to a plurality of individually-controllable loads such as electric lamps or groups of lamps.

According to the present invention in an electrical installation comprising at least two separate loads connected to electricity supply terminals through separate electrically-operable switches controlled by individual, manually-operable switches, each electrically-operable switch is adapted to operate in response to operation of its associated manually-operable switch for a first predetermined period of time, and at least one of the manually-operable switches is connected to apparatus including a delay device responsive to operation of the last said manually-operable switch for a second period of time longer than the first period of time to effect operation of the electrically-operable switch associated with the other manually-operable switch. Thus by means of a relatively short operation of a manually-operable switch one load can be switched on and by a relatively long operation of the same switch a further load can be switched on. Push-button switches are preferred.

Figure 1:
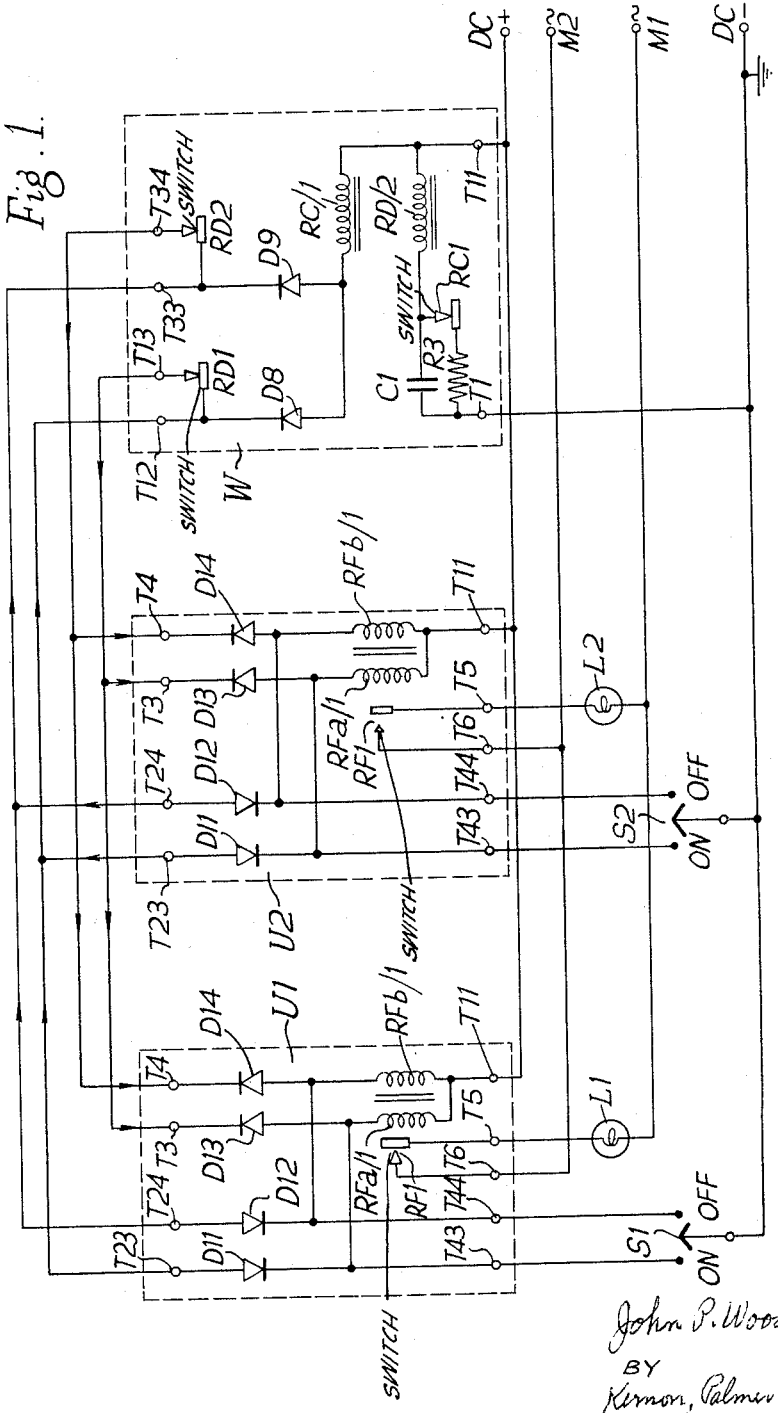
Figure 3:
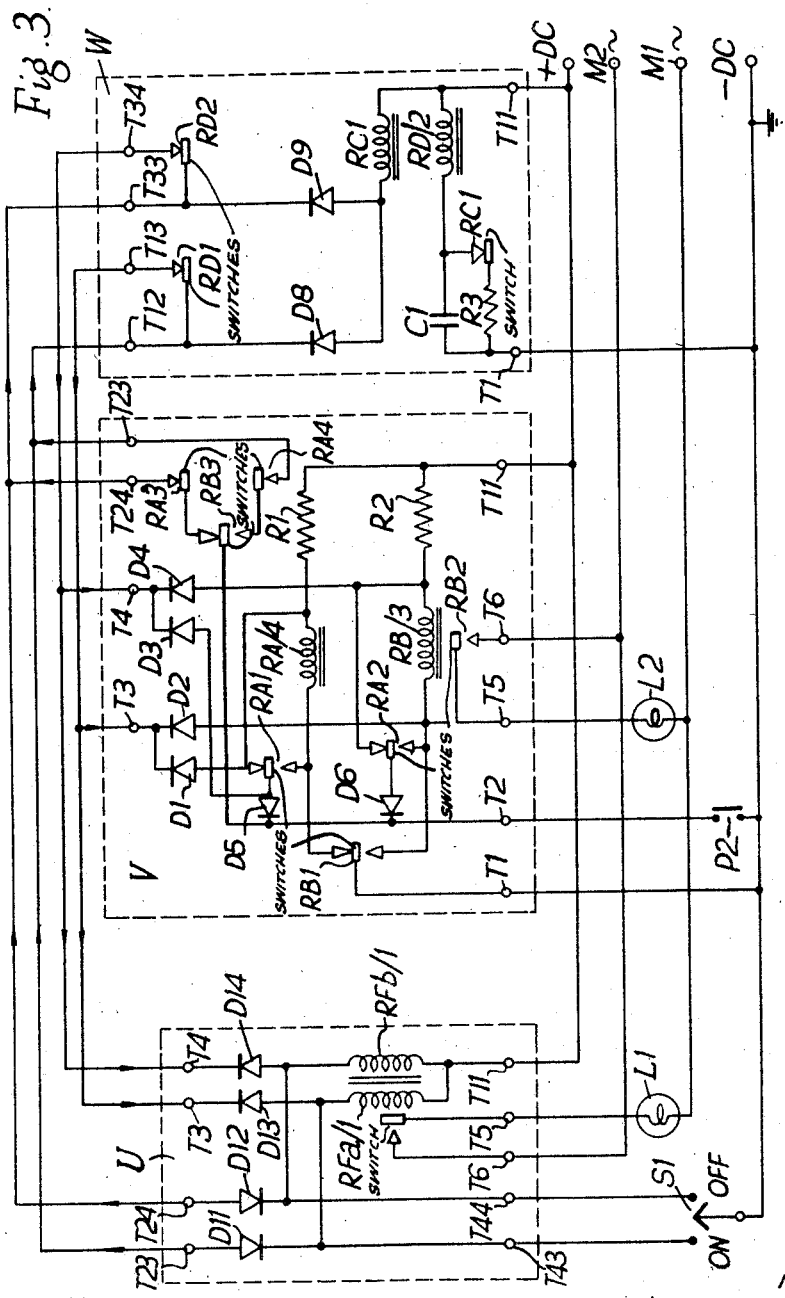

The invention will now be described, by way of example, with reference to the accompanying drawings, in which:

FIG. 1 is a circuit diagram of an electrical installation embodying two lamps controllable individually and collectively by manually-operable switches each connected into a control system by three connections, FIG. 2 is a circuit diagram of a further electrical installation embodying two lamps controllable individually and collectively by two manually-operable switches each connected into a control system by two connectors, FIG. 3 is a circuit diagram of an electrical installation embodying part of each of the installations shown in FIGS. 1 and 2, and FIG. 4 is a circuit diagram of a modified form of the installation shown in FIG. 2.

In the drawings each relay is given a reference in the form of two letters followed by an oblique stroke and a number. The number indicates how many contacts are provided on the relay. Individual contacts have the same reference letters as the relay and are followed by consecutive numbers. For example the relay RD/2 of FIG. 1 has two contacts which have the references RD1 and RD2 respectively. All the relay contacts are shown in the position they occupy when the relays are de-energised.

Referring to FIG. 1 in an electrical installation embodying two lamps $L_1$ and $L_2$ each lamp is connected on one side to an alternating current mains supply terminal $M_1$. The other side of the lamp $L_1$ is connected to a terminal T5 of a control unit $U_1$ and the other side of the lamp $L_2$ is connected to a terminal T5 of a control unit $U_2$ identical with the unit $U_1$. The other mains terminal $M_2$ is connected to terminals T6 of the units $U_1$ and $U_2$.

Each of the units $U_1$ and $U_2$ embodies a relay RF which has a split winding the two halves of the winding having the references RFa and RFb. This relay has single contacts RF1 which are closed by energisation of the winding RFa and opened by energisation of the winding RFb. The contacts RF1 are connected between the terminals T5 and T6 in each of the units $U_1$ and $U_2$ whereby they can be used to switch the lamps $L_1$ and $L_2$ on and off.

A three-position, manually-operable switch $S_1$ has one terminal connected to a terminal —DC which is earthed and to which the negative pole of a direct current relay supply is connected. A second terminal marked ON is connected to a terminal T43 of the unit $U_1$ and a third terminal marked OFF is connected to a terminal T44 of the unit $U_1$. The switch $S_1$ is biased to the neutral and can be held by finger pressure in the ON or OFF condition as required making contact between earth and the terminal T43 or T44 of the unit $U_1$.

An identical switch $S_2$ is connected between earth and the terminals T43 and T44 of the unit $U_2$.

In each of the units $U_1$ and $U_2$ the terminals T43 and T44 are connected through rectifiers D11 and D12 to terminals T23 and T24 respectively. In addition the terminal T43 is connected through the relay winding RFa to a terminal T11 and the terminal T44 is connected through the relay winding RFb to the terminal T11. The terminals T43 and T44 are also connected through rectifiers D13 and D14 to two terminals T3 and T4.

The terminals T23 of the units $U_1$ and $U_2$ are connected together and to a terminal T12 of a further unit W. Similarly the terminals T24 of the two units $U_1$ and $U_2$ are connected together and to a terminal T33 of the unit W.

Within the unit W the terminal T12 is connected through a rectifier D8 and a relay winding RC in series to a terminal T11 which in turn is connected to the terminal +DC. The terminal T33 is similarly connected through a rectifier D9 and the relay winding RC to the terminal T11. There is an additional connection from the terminal T12 through relay contacts RD1 to a terminal T13 and another connection from the terminal T33 through relay contacts RD2 to a terminal T34. The terminals T13 and T34 are connected as shown to the terminals T3 and T4 of the units $U_1$ and $U_2$.

A relay winding RD in the unit W is connected in series with a capacitor C1 between the terminal T11 and a terminal T1 which is earthed. The capacitor C1 is shunted by a resistor R3 and contacts RC1 in series.

In describing the operation of the installation it will be assumed first of all that the switch $S_1$ is pressed to the ON state for a brief instant. An earth is thereby applied to the upper end (in the drawing) of the relay winding RFa and hence an energising circuit is completed for this winding. Thus the contacts RF1 close and complete a supply circuit to the lamp $L_1$ from the mains terminals $M_1$ and $M_2$. The contacts RF1 remain closed until opened by a pulse of current through the winding RFb.

The lamp $L_2$ can be switched on by a like operation of the switch $S_2$.

To switch off the lamp $L_1$ the switch $S_1$ is pressed to the OFF position for a brief instant whereby an energising circuit is completed for the winding RFb and the contacts RF1 are opened. The lamp $L_2$ can be switched off by a like operation of the switch $S_2$.

Thus each of the lamps $L_1$ and $L_2$ can be switched on and off by brief operations of their associated switches $S_1$ and $S_2$.

It will now be assumed that the switch $S_1$ is held in the ON position for a period exceeding two seconds.

It will be seen that the earth applied to the terminal T43 by the switch $S_1$ is transmitted by the rectifier D11 but is blocked by the rectifier D13. The earth transmitted by the rectifier D11 is applied through the terminal T23 to the terminal T12 on the unit W and thence through the rectifier D8 to the relay winding RC which is then energised.

The relay winding RD is normally energised through the contacts RC and the resistor R3 whereby the contacts RD1 and RD2 are normally open and the terminals T12 and T33 are isolated from the terminals T13 and T34 respectively.

When the relay RC is energised as described the contacts RC1 open and hence the only current for operating the relay RD is the charging current flowing into the capacitor C1.

As this capacitor charges the charging current falls and eventually reaches a value which is insufficient to "hold" the relay which becomes de-energised and the contacts RD1 and RD2 close. The time constant of charge of the capacitor C1 is arranged to be such that the contacts RD1 and RD2 close at two seconds.

The contacts RD1 in closing apply the earth on the terminal T12 through the terminal T13 to the terminals T3 on the units $U_1$ and $U_2$.

The lamp $L_1$ is already switched on and will be ignored. The earth applied to the terminal T3 of the unit $U_2$ is transmitted through the rectifier D13 to the relay winding RF$a$ which is therefore energised and the lamp $L_2$ is switched on.

Thus by holding the switch $S_1$ in the ON state for a period in excess of two seconds both lamps $L_1$ and $L_2$ are switched on. In like fashion by holding the switch $S_2$ in the ON state for more than two seconds both lamps $L_1$ and $L_2$ can be switched on.

This facility in no way interferes with the ability to switch off each lamp individually by appropriate operation of the appropriate one of the switches $S_1$ and $S_2$ to the OFF state for a brief period.

If however it is required to switch off both lamps by operation of one switch this can be effected by holding either of the switches in the OFF state for a period exceeding two seconds as will now be described.

It is assumed that both lamps are energised and the switch $S_2$ is held in the OFF state for more than two seconds. The lamp $L_1$ is switched off as previously described by energisation of the relay winding RF$b$.

The earth applied by the switch $S_2$ to the terminal T44 of the unit $U_2$ is transmitted through the rectifier D12 to the terminal T24 and thence to the terminal T33 of the unit W.

Thus the relay RC is energised through the rectifier D9 and the unit functions as previously described to close the contacts RD1 and RD2 after two seconds. The earth applied to the terminal T33 is transmitted through the contacts RD2 and the terminal T34 to the terminals T4 of the units $U_1$ and $U_2$. The lamp $L_2$ is already switched off as previously described and hence will be ignored.

The earth on the terminal T4 of the Unit $U_1$ is applied through the rectifier D14 to the relay winding RF$b$ whereby this winding is energised and the lamp $L_2$ is switched off.

To summarise the facilities provided by the installation shown in FIG. 1 each lamp can be switched on and off individually by operation of its associated manually-operable switch for a brief instant. It addition both lamps can be switched on and switched off by operation of either of the two manually-operable switches for a period exceeding two seconds, and when so switched on can be switched off individually by brief operation of the individual switches.

Although the embodiment described with reference to FIG. 1 has only two lamps and their associated control units as many lamps as desired can be controlled by adding an additional unit U for each lamp the terminals of each additional unit being connected in the same manner as the units $U_1$ and $U_2$ shown in FIG. 1.

It will be seen that each of the manually-operable switches shown in FIG. 1 requires three connections to it whereby the switch wiring has to be effected in three-core cable.

An embodiment in which two-pole, push-button switches and two-core switch cabling are used will now be described, with reference to FIG. 2.

In FIG. 2 the two lamps $L_1$ and $L_2$ are connected on one side to the mains terminal $M_1$ as in FIG. 1. The other sides of the lamps are connected to terminals T5 of two identical control units $V_1$ and $V_2$ respectively, and terminals T6 of these units are connected to the mains terminal $M_2$ as in FIG. 1. Similarly terminals T11 of the units $V_1$ and $V_2$ are connected to the terminal +DC.

Terminals T1 of the units $V_1$ and $V_2$ are connected to the terminal −DC and hence to earth and terminals T2 are connected through two-pole, push-button switches $P_1$ and $P_2$ respectively to earth.

In each of the units $V_1$ and $V_2$ there are two relays RA and RB. Changeover contacts RB1 are connected to the terminal T1 and through the relay windings RA and RB and series resistors R1 and R2 respectively to the terminal T11.

The terminal T2 is connected through a rectifier D5 to changeover contacts RA1 and through a rectifier D6 to changeover contacts RA2. By means of the changeover contacts RA1 the terminal T2 can be connected to either side of the relay winding RA. By means of the changeover contacts RA2 the terminal T2 can be connected to either side of the relay winding RB. The terminal T2 is also connected through changeover contacts RB3 and either contacts RA3 or RA4 to a terminal T24 or a terminal T23.

The fixed member of the changeover contacts RA1 is connected through rectifiers D1 and D3 to terminals T3 and T4 respectively and the two ends of the relay winding RB are connected through rectifiers D2 and D4 to the two terminals T3 and T4 respectively.

The unit W is identical with the unit W of FIG. 1 and need not be described. The terminals T3 of the units $V_1$ and $V_2$ are connected together and to the terminal T13 of the unit W. Similarly the terminals T4 of the units $V_1$ and $V_2$ are connected together and to the terminal T34 of the unit W. Likewise the terminals T24 are connected to the terminal T33 and the terminals T23 are connected to the terminal T12.

Initially the relay RB is de-energised and the relay RA is energised from T1 through the contacts RB1 through the winding RA and the resistor R1 to the terminal T11. Thus the contacts RA1, RA2, RA3 and RA4 are in the opposite state to that shown.

Assuming the push-button switch $P_1$ to be pressed for a brief instant an energising circuit for the relay RB is completed through the rectifier D6 and the contacts RA2 whereby the contacts RB2 close and switch on the lamp $L_1$. In addition the changeover contacts RB1 provide a holding circuit for the relay RB and break the main energising circuit of the relay RA.

If the push-button switch $P_1$ is depressed again for a brief instant the relay winding RB is short-circuited through the rectifier D6 and the contacts RA2 whereby the relay RB is deenergized and the lamp $L_1$ is switched off.

The lamp $L_2$ can be switched on and off in like fashion by brief depressions of the button on the switch $P_2$.

If now the push-button switch is held on for a period exceeding two seconds, initially the lamp $L_1$ is switched on by energisation of the relay RB as just described. In addition the terminal T23 is earthed through contacts RB3 and RA4 (relay RA is held on as long as the switch $P_1$ is pressed) and hence the terminal T12 of the unit W is earthed.

This unit functions as described with reference to FIG. 1 and after a delay of two seconds the earth is applied from the terminal T12 through the contacts RD1 to the terminal T13.

Thus the terminal T3 of the unit $V_2$ is earthed and is transmitted through the rectifier D2 to the relay winding RB which is energised and switches on the lamp $L_2$.

If both lamps are switched on and the switch $P_1$ is held on for a period of more than two seconds, initially the relay RB is de-energized as previously described and the lamp $L_1$ is switched off. With the relays RA and RB of the unit $V_1$ deenergized the terminal T24 and hence T33 are earthed.

After a delay of two seconds the earth on the terminal T33 is transmitted through the relay contacts RD2 to the terminal T34 and thence to the terminal T4 of the unit $V_2$. This earth is transmitted through the rectifier D4 to the relay RB which becomes de-energised whereby the lamp $L_2$ is also switched off. Both lamps can be switched off in the same way by operation of the switch $P_2$ for more than two seconds.

Thus the installation of FIG. 2 provides the same facilities as the installation of FIG. 1 and has the advantage of needing only two-core cables for switch wiring and only two-pole switches.

As with the arrangement of FIG. 1 more lamps can be added and controlled as described with reference to FIG. 2 by adding more units V and switches P.

Turning now to FIG. 3 this shows an installation which is a combination of FIGS. 1 and 2. It will be seen that the unit U is identical with the units $U_1$ and $U_2$ in FIG. 1 and that the unit V is identical with the units $V_1$ and $V_2$ in FIG. 2. The unit W is identical with the unit W of FIGS. 1 and 2.

In operation the lamp $L_1$ can be switched on and off by brief operations of the switch $S_1$ as described with reference to FIG. 1. Similarly the lamp $L_2$ can be switched on and off by brief operations of the switch $P_2$ as described with reference to FIG. 2.

With both lamps switched off prolonged operation of the switch $S_1$ in its ON state causes the lamp $L_1$ initially to be switched on and after two seconds causes an earth to appear on the terminal T13 of the unit W as described with reference to FIG. 1.

As the terminal T13 is connected to the terminal T3 of the unit $V_2$ this functions as described with reference to FIG. 2 and the lamp $L_2$ is also switched on.

Both lamps $L_1$ and $L_2$ can likewise be switched on by prolonged operation of the switch $L_2$.

More lamps can be similarly controlled by adding more U or V units, or both, and their appropriate switches to the circuit of FIG. 3.

Turning now to FIG. 4 this is a circuit diagram of an embodiment of the invention in which prolonged depression of the switch $P_2$ will switch on all the lamps if the lamps $L_1$ and $L_3$ are off and will switch off all the lamps if either $L_1$ or $L_3$ is on. In addition individual control of the lamps $L_1$, $L_2$ and $L_3$ can be effected by brief operations of their associated switches $P_1$, $P_2$ and $P_3$ respectively.

The units $V_1$, $V_2$ and $V_3$ of FIG. 4 are identical with one another and identical with the units $V_1$ and $V_2$ of FIG. 2 with the exception that the relay contacts RB3, RA3 and RA4 and associated terminals T23 and T24 are not used and changeover contacts RA3 are connected between terminals T8, T9 and T10 in the manner shown in FIG. 4. Also terminal T7 is added.

The unit Y of FIG. 4 is the same as the unit W of FIGS. 1, 2 and 3 with the exception that the terminals T33 and T34 with their associated contacts RD2 and rectifier D9 are omitted. The rectifier D8 of the unit W is also omitted in the unit Y, and the contact RD1 is taken switch $P_4$ and the wiring shown in chain-dotted lines is to the terminal T1. It will be assumed initially that the omitted.

It will readily be seen that individual control of the lamps $L_1$, $L_2$ and $L_3$ by their push-button switches $P_1$, $P_2$ and $P_3$ is as described with reference to FIG. 2

Assume now that the lamps $L_1$ and $L_3$ are switched off and that the lamp $L_2$ is also off. The relays RA in the three units $V_1$, $V_2$ and $V_3$ are energised. If the switch $P_2$ is depressed for a period exceeding two seconds, initially the lamp $L_2$ will be switched on and after a period of two seconds the earth applied through the terminal T7 to the terminal T12 of the unit Y causes the relay RD to be de-energised whereby an earth is applied through contacts RD1 to the terminal T13. This terminal is connected to the terminal T8 of the unit $V_1$ which in turn is connected through contacts RA3 to the terminal T9. This is connected through terminal T8 of the unit $V_3$ and its associated contacts RA3 to the terminal T9 of that unit.

This terminal is connected to the terminals T3 of the units $V_3$ and $V_4$ and hence causes the relays RB in these units to be enrgised as described with reference to FIG. 2, whereby the lamps $L_1$ and $L_3$ are switched on. By arranging that the release time of the relay RD is longer than the operating time of the relay RB it is assured that the lamp $L_2$ is switched on.

The circuit is not however dependent upon the lamp $L_2$ being off in order to enable the lamps $L_1$ and $L_3$ to be switched on. If the lamp $L_2$ is on and the other lamps $L_1$ and $L_3$ are off the action of the circuit is as follows when the switch $P_2$ is depressed for more than two seconds:

The relays RA in the units $V_1$ and $V_3$ are initially energised and the relay RA in the unit $V_2$ is de-energised with the relay RB in this unit energised.

The earth applied to the terminal T2 of the unit $V_2$ by the switch $P_2$ is applied as just described through the terminal T7 to the unit W which after two seconds provides an earth at the terminal T13 and switches on the lamps $L_1$ and $L_3$ exactly as previously described.

The depression of the switch $P_2$ switches off the lamp $L_2$ initially but this is switched on again by the earth applied to the terminal T3.

Thus irrespective of whether the lamp $L_2$ is on or off all lamps are switched on by a prolonged operation of the switch $P_2$ if the other lamps $L_1$ and $L_2$ are in the switched off state.

Assume now that all lamps are on and the switch $P_2$ is depressed for a period exceeding two seconds. Initially the lamp $L_2$ is switched off. After two seconds the terminal T13 of the unit Y is earthed as previously described and this earth is applied to the terminals T4 of the units $V_1$ and $V_3$ through the terminal T8, contacts RA3 and the terminal T10 of the unit $V_1$ and hence the lamps $L_1$ and $L_3$ are switched off.

If instead of both lamps $L_1$ and $L_3$ being on only the lamp $L_1$ had been on the earth applied to the terminal T4 of the unit $V_1$ switches off the lamp $L_1$.

If only $L_3$ had been on then the earth applied to the terminal T8 of the unit $V_1$ would have been transmitted from the terminal T9 of the unit $V_1$ to the terminal T8 of the unit $V_3$ and thence through its associated contacts RA3 to the terminals T10 and T4 of the unit $V_3$ whereby the lamp $L_3$ would be switched off.

A modification of the circuit of FIG. 4 shown by the addition of a switch $P_4$ and wiring in chain-dotted lines, enables all lamps additionally to be switched on and off by the additional switch without the two seconds delay of the arrangements already described. The additional switch $P_4$ enables all lamps to be extinguished if any is alight and all to be switched on if none is alight. Freedom of control by the switches $P_1$, $P_2$ and $P_3$ is still maintained.

If in the arrangement of FIG. 4 all lamps are switched off and the switch $P_4$ is depressed, an earth is transmitted through the terminals T8 and T9 of the unit $V_2$ and thence through the terminals T8 and T9 of the unit $V_1$ to the terminal T8 of the unit $V_3$. This terminal is connected to its associated terminal T9 and hence the earth is transmitted to all the terminals T3 and the three lamps are switched on. The relays RA are released when the push-button $P_4$ is released.

If the switch $P_4$ is again depressed an earth is applied through terminals T8 and T10 of the unit $V_2$ to all the terminals T4 whereby the lamps are switched off. The relay RA is energised when the switch $P_4$ is released. It will be appreciated that not all the lamps need be on and that any one or more which are on will be switched off.

The switch P₄ can be positioned adjacent the entrance door whereby full lighting can be switched on when entering.

In yet another modification the switch P₄ is made to serve as P₃ or P₄ in dependence upon a changeover relay controlled by a time switch. Thus it can be arranged that for early morning use the switch functions as the switch P₃ whereas for the remainder of the twenty-four hours it functions as the switch P₄. This feature is of value in installations such as, for example, hotel bedrooms or suites of rooms.

Again it will be understood that the embodiment is not limited to the number of lamps shown in FIG. 4. Any desired number of lamps can be added with their associated control units.

Whilst applications of the invention to the control of lighting have been described it will be understood that the invention may be applied to control other loads such as heating and ventilating. Neither is the invention limited to applications in buildings. It finds application, for example, in ships, aircraft and other vehicles.

It will also be understood that although embodiments using electromagnetic relays have been described other electrically-operable relays such as thyratrons, transistors and electron discharge valves can be employed. Since, however, high speeds of operation are not necessary, electromagnetic relays are preferred.

I claim:

1. An electrical installation comprising: at least two loads; electrical supply terminals for said loads; separate electrically operable switches for switching said loads; means connecting said electrically operable switches in circuit between said supply terminals and said loads; separate manually operable switches to control said electrically operable switches; circuit means connecting said manually operable switches to said electrically operable switches, said circuit means connecting at least a first of said manually operable switches to its associated electrically operable switch, including delay switching means connected to another of said electrically operable switches to operate the other electrically operable switch by prolonged manual operation of the said first manually operable switch.

2. An installation according to claim 1 and including a further manually operable switch connected to all the electrically operable switches whereby all loads can be switched simultaneously without delays.

3. An installation according to claim 1, wherein said first manually operable switch is a two-pole switch, said delay-switching means has two control circuits; means to complete a first of said control circuits through said first manually operable switch when the load associated with said first manually operable switch is switched on; and means to complete a second of said control circuits when the load associated with said first manually operable switch is switched off.

4. An electrical installation comprising: at least two loads; electrical supply terminals for said loads; separate electromagnetic relays for switching said loads, each electromagnetic relay having relay contacts and electromagnetic operating means; circuits connecting the contacts of said relays in series with said loads respectively to said supply terminals; separate manually operable switches to operate said relays; circuit means connecting said manually operable switches to said electromagnetic operating means of said relays respectively; and delay switching means connecting at least one of said manually operable switches to the electromagnetic operating means of at least one of the relays associated with the other of said manually operable switches, to operate said at least one of the relays on prolonged operation of said at least one of the manually operable switches.

5. An installation according to claim 4 wherein the delay-switching means comprise: a control relay; a further relay; a capacitor connected in shunt with said further relay; means normally energizing said control relay through the contacts of said further relay, said further relay being in a circuit which is completed on operation of at least one of said manually operable switches; whereby the contacts shunting said capacitor open and the control relay is de-energized when the charging current falls below the current necessary for holding the control relay in its energized state.

6. An installation according to claim 4, wherein at least one of said relays has two windings, a first to effect switching on when energized and the second to effect switching off when energized; and the manually operable switch associated with said one relay has three positions, in one of which an energizing circuit is completed to the first relay winding, and in the second of which an energizing circuit is completed to the second relay winding, the third position of the switch being a neutral position.

7. An installation according to claim 6, wherein operation of the last said manually operable switch to its first and second positions completes two different circuits to the delay device; and the delay switching means is responsive to prolonged operation of the manually operable switch to its first and second positions to complete first and second control circuits respectively for switching other loads on and off.

8. An installation according to claim 7, wherein all the said manually operable switches are alike three-position switches, all the electromagnetic relays are alike two-winding relays, and the said first and second control circuits include the first and second windings of all the relays.

9. An installation according to claim 4, wherein at least one of said relays has a single winding and the manually operable switch associated therewith is a two-pole switch, the single-winding relay having associated therewith a second relay to prepare an energizing circuit for the said one relay when the latter is de-energized, and to prepare a de-energizing circuit for the said one relay when the latter is energized.

10. An installation according to claim 9, wherein the two relays last referred to have contacts associated therewith, operation of the manually operable switch when both the relays are de-energized completing a first circuit to the delay-switching means and when both the relays are energized completing a second circuit to the delay device.

11. An installation according to claim 10, wherein the delay-switching means is responsive to completion of the first circuit for a prolonged period of time to complete a first control circuit for switching other loads on, and is responsive to completion of the said second circuit for a prolonged period of time to complete a second control circuit for switching the other loads off.

12. An installation according to claim 11, wherein all the said manually operable switches are two-pole switches and all the relays include a single winding.

13. An installation according to claim 12, wherein the first control circuit is connected to one end of the single winding of each of said one relay and the second control circuit is connected to the other end of the single winding of each said one relay.

References Cited by the Examiner

UNITED STATES PATENTS

| 1,019,484 | 5/12 | Kennedy | 307—115 X |
| 2,424,243 | 7/47 | Lowell | 307—155 X |
| 2,424,829 | 7/47 | Jackson | 307—112 |
| 2,576,903 | 11/51 | Imm | 307—112 |
| 2,963,595 | 12/60 | Hinrichs | 307—112 |

LLOYD McCOLLUM, *Primary Examiner.*

MILTON O. HIRSHFIELD, ORIS L. RADER,
*Examiners.*